(12) United States Patent
Chow et al.

(10) Patent No.: US 7,408,450 B2
(45) Date of Patent: Aug. 5, 2008

(54) STEERING WHEEL DIRECTION INDICATOR FOR NEUTRAL START (75) Inventors: Mark K. Chow, Paoli, PA (US); Robert L. Fackler, Ephrata, PA (US); Charles H. Hoffman, New Holland, PA (US)

(73) Assignee: CNH America LLC, New Holland, PA (US)

( * ) Notice: Subject to any disclaimer, the term of this patent is extended or adjusted under 35 U.S.C. 154(b) by 455 days.

(21) Appl. No.: 11/267,378

(22) Filed: Nov. 4, 2005

(65) Prior Publication Data
US 2007/0024434 A1 Feb. 1, 2007

Related U.S. Application Data (60) Provisional application No. 60/699,626, filed on Jul. 15, 2005.

(51) Int. Cl.
*B60Q 1/00* (2006.01)
*B60Q 1/34* (2006.01)
*B62D 6/00* (2006.01)

(52) U.S. Cl. .................. 340/438; 340/465; 180/6.2

(58) Field of Classification Search ................ 340/438, 340/439, 440, 457, 465, 463–469, 475–478; 180/6.2–6.7; 701/1, 41–50, 318
See application file for complete search history.

(56) References Cited

U.S. PATENT DOCUMENTS

| | | | |
|---|---|---|---|
| 3,605,391 A | 9/1971 | Schott et al. |
| 4,335,561 A | 6/1982 | Swanson et al. |
| 4,931,967 A | 6/1990 | Boe et al. |
| 4,969,527 A | 11/1990 | Boe et al. |
| 4,979,092 A | 12/1990 | Bergene et al. |
| 5,320,186 A | 6/1994 | Strosser et al. |
| 5,455,769 A | 10/1995 | Panoushek et al. |
| 5,469,694 A | 11/1995 | Panousheck et al. |
| 5,472,056 A | 12/1995 | Orbach |
| 5,549,166 A | 8/1996 | Orbach et al. |
| 5,684,691 A | 11/1997 | Orbach et al. |
| 5,713,190 A | 2/1998 | Vermeulen et al. |
| 5,810,095 A | 9/1998 | Orbach et al. |
| 5,899,279 A | 5/1999 | Bennett et al. |
| 6,058,343 A | 5/2000 | Orbach et al. |
| 6,105,679 A | 8/2000 | Schubert et al. |
| 6,216,072 B1 | 4/2001 | Boe et al. |
| 6,588,187 B2 | 7/2003 | Engelstad et al. |

*Primary Examiner*—Davetta W. Goins
*Assistant Examiner*—Sigmund Tang
(74) *Attorney, Agent, or Firm*—Patrick M. Sheldrake; John William Stader; Michael C. Harms (57) ABSTRACT A visual steering wheel direction indicator for a self-propelled machine. The indicator may additionally exhibit an indicator of the amount that the steering wheel must be turned in order to reach neutral. The indicator may be integrated into a neutral start system.

12 Claims, 6 Drawing Sheets

| TURN STEERING WHEEL STEER LEFT <<< | FIG.6a |
| TURN STEERING WHEEL STEER LEFT << | FIG.6b |
| TURN STEERING WHEEL STEER LEFT < | FIG.6c |
| TURN STEERING WHEEL STEER LEFT | FIG.6d |
| OK TO START | FIG.6e |
| OIL PRESSURE: NONE<br>COOLANT: COLD<br>BAT VOLT: 12.8<br>SPEED,MPH: 0.0 | FIG.6f |
| TURN STEERING WHEEL STEER RIGHT >>> | FIG.6g |
| TURN STEERING WHEEL STEER RIGHT >> | FIG.6h |
| TURN STEERING WHEEL STEER RIGHT > | FIG.6i |
| TURN STEERING WHEEL STEER RIGHT | FIG.6j |

STEERING WHEEL DIRECTION INDICATOR FOR NEUTRAL START

CROSS-REFERENCE TO RELATED APPLICATIONS

This application claims priority to U.S. Provisional Patent Application 60/699626 entitled "Apparatus and Computer Program to Provide a Steering Wheel Direction Indicator for Neutral Start" filed on Jul. 15, 2005, in the name of the same entity as the present application.

BACKGROUND OF THE INVENTION

The present invention relates generally to self-propelled harvesting machines, and more particularly to a steering wheel direction indicator for a neutral start system on an agricultural windrower.

It is known in the prior art that the safety of self-propelled machinery is sometimes improved by the integration of a neutral start requirement to prevent unexpected machinery movement upon startup. Many devices, mechanical and electronic, are available for this purpose. It is not however, common practice to require a fully neutral positioning of the steering wheel in a hydrostatic drive system. Such requirement promotes even more safety, for operators, bystanders and the machinery, by eliminating the possibility of not only unexpected forward motion, but also sideways movement.

Hydrostatic drive systems are often configured with the pump attached directly to the engine without a clutch or other mechanism to stop output flow of the pump while the engine is running. The vehicle is then subject to movement based on the pump displacement control, which most commonly is moved selectively through forward-neutral-reverse positions by the operator. Currently, vehicles equipped with this type of drive system utilize a mechanical latch to trap the displacement control in neutral for starting. The latch also activates a switch or series of switches to complete the electrical starting circuit. Most of these systems include several moving parts and require complicated adjustment to maintain functionality.

It would be of great advantage to provide a steering wheel direction indicator system as part of a neutral start on a self-propelled machine that prevents all inadvertent movement of the machine upon startup.

SUMMARY OF THE INVENTION

Accordingly, it is an object of the present invention to provide a steering wheel direction indicator for a neutral start system on a self-propelled harvester.

It is another object of the present invention to provide a steering wheel direction indicator for a self-propelled agricultural windrower.

It is another object of the present invention to provide a mechanism for indicating the direction the steering wheel must be turned in order to reach neutral so that the machine may be started.

It is another object of the present invention to provide a mechanism for preventing the starting of a self-propelled agricultural windrower until the steering wheel is in a fully neutral position, i.e., neutral displacement of the drive wheel pumps.

It is a further object of the present invention to provide a steering wheel direction indicator for a neutral start system on a hydrostatically driven harvester.

It is a further object of the present invention to provide a system for indicating the direction the steering wheel must be turned to put a self-propelled hydrostatically driven machine in a fully neutral position.

It is a further object of the present invention to provide a visual representation of the steering wheel position relative to the neutral position.

It is a further object of the present invention to provide a steering wheel direction indicator for a neutral start that is easy to use, simple to manufacture, and cost effective.

It is an even still further object of the present invention to provide a system that presents a visual indication of the direction and amount the steering wheel of a self-propelled machine must be turned to achieve a neutral condition.

These, and other, objectives are attained by providing a visual steering wheel direction indicator for a self-propelled machine. The indicator may additionally exhibit an indicator of the amount that the steering wheel must be turned in order to reach neutral. The indicator may be integrated into a neutral start system.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
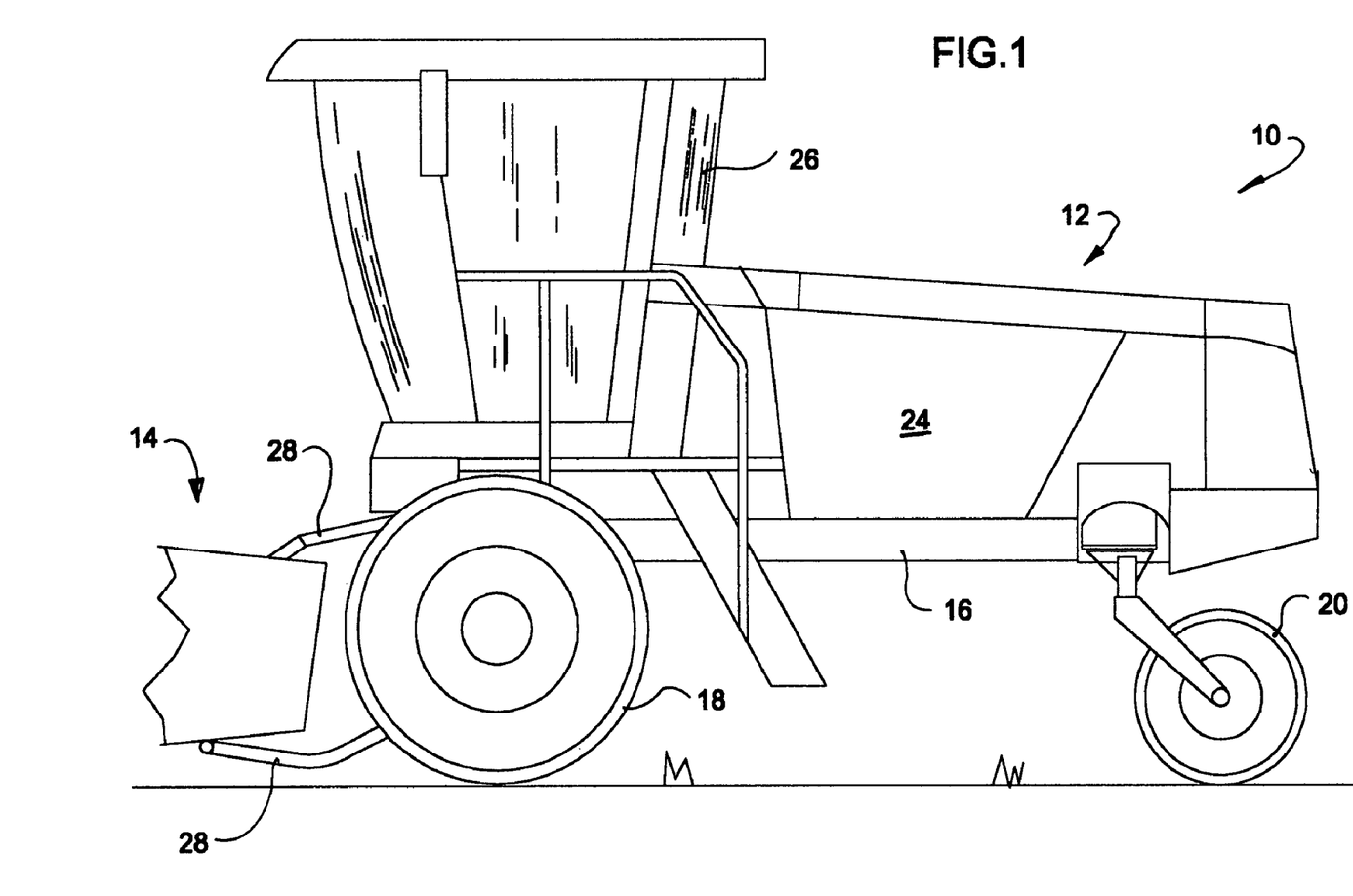
FIG. 1 is a partial side elevational view of a crop harvesting machine of the type with which the invention may be used, also showing a simplified side view of the lift and flotation system of the instant invention.

FIG. 1 shows the two primary components of a self-propelled windrower 10, i.e., tractor 12 and header 14. Tractor 12 has a main frame 16, with a longitudinal horizontal axis from front to back, that is supported by a pair of drive wheels 18(only one shown) on the forward portion thereof and a pair of rear wheels 20 adjacent the rear end. An engine, located under cowling 24, a transmission and other components, all well known in the art, are supported on the main frame 16 and provide the power necessary for the machine to operate. A cab 26, also supported on the main frame, encloses the operator's platform to provide an environmentally controlled location from which the windrower may be comfortably operated.

Header 14 may be of several designs, but typically comprises a cutting mechanism, either a sickle bar or rotary cutter, a feeder mechanism and conditioning rolls. The header is supported by a hydraulic lift and flotation structure 28 that may be activated to selectively raise or lower the header between transport and operational positions.

The general mode of operation of a modern windrower is to have tandem hydrostatic pumps, one for each of two drive wheels, each pump having a depending pintel arm such that forward and reverse movement of the pintel arm relative to a neutral position causes the associated hydrostatic pump, and thus the associated drive wheel, to rotate. During the original assembly of the windrower and during normal maintenance and repair operations in the life of the machine, the pintel arms must be adjusted to neutral.

Figure 2:
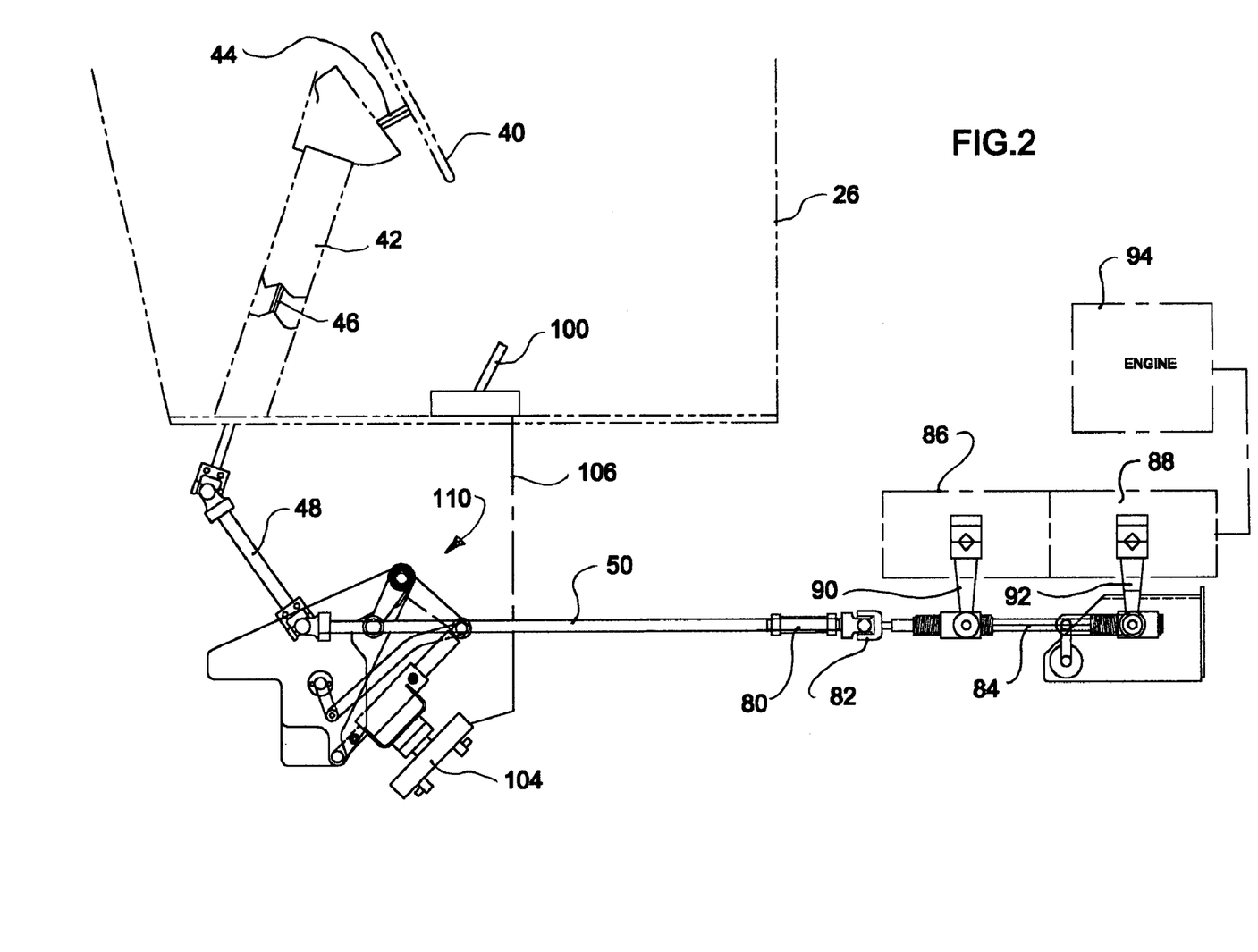
FIG. 2 is a partial left side view of the hydrostatic control system of the windrower, with some components of a neutral start interlock with which the instant invention could be used.

Referring now to FIG. 2, a suitable hydrostatic control system is shown to include a conventional steering wheel 40 and console 42 inside the operator's cab 26. The cab would, of course, include additional components (not shown) such as a seat, electrical and mechanical controls for operation of the windrower, an air conditioning unit, and the like. The steering wheel is attached to a stub shaft 44 that is connected to the upper end of front shaft 46 by a universal connector (not shown). The universal connector is well known in the art as a mechanism to transmit rotational movement between two shafts that are not necessarily in axial alignment. The lower end of front shaft 46 is connected to elongate bottom shaft 50 by another universal connector, or power-take-off shaft 48. A length adjustment assembly 80 is attached to the rear most end of bottom shaft 50. Note here that substantially the entire steering system is covered and there is no practical way for the operator sitting in the cab to know which direction to turn the steering wheel to the neutral position or whether the steering is in neutral position or not.

Length adjustment assembly 80 is connected, by another universal connector 82, to elongate threaded rod-like member 84—one end with right-hand threads and the other with left-hand threads—, such that any turn of steering wheel 40 results in a proportional turn of member 84. Two tandem hydraulic pumps 86, 88 are located above member 84 and each has a pintel arm 90, 92, respectively, depending therefrom. Each pintel arm has an internally threaded block threaded onto member 84, such that rotation of the rod causes the pintle arm to move either forwardly or rearwardly, depending upon the direction of rotation of member 84. Thus, rotation of member 84 results in one pintel arm rotating in a clockwise direction and the other rotating in a counter-clockwise direction, when viewed from the side, as in FIG. 2. If the tractor is in motion, this causes one pump to increase flow and the other to decrease flow, turning the windrower; however, if the system is already in mechanical neutral, turning the steering wheel increases flow in both pumps, but in opposite directions—the tractor turning around itself with one wheel going forward and one going in reverse. Engine 94 supplies power to the hydraulic pumps.

Within cab 26 is a forward-neutra-reverse lever 100. This is continuously and selectively movable to allow a change in speed in either the forward or reverse directions. The neutral position has either an indent or other mechanism to allow easy recognition by the operator. Lever 100 is intended to selectively move member 84 forwardly or rearwardly to simultaneously move both pintel arms an equal amount, thus allowing an equal increase or decrease in flow from the hydraulic pumps. In this embodiment, lever 100 is electrically connected (shown graphically as line 106) to linear motor 104 which moves bottom shaft 50 and member 84 through the action of the forward-neutral-reverse shift control mechanism 110 forwardly or rearwardly under the control of the operator.

Figure 3:
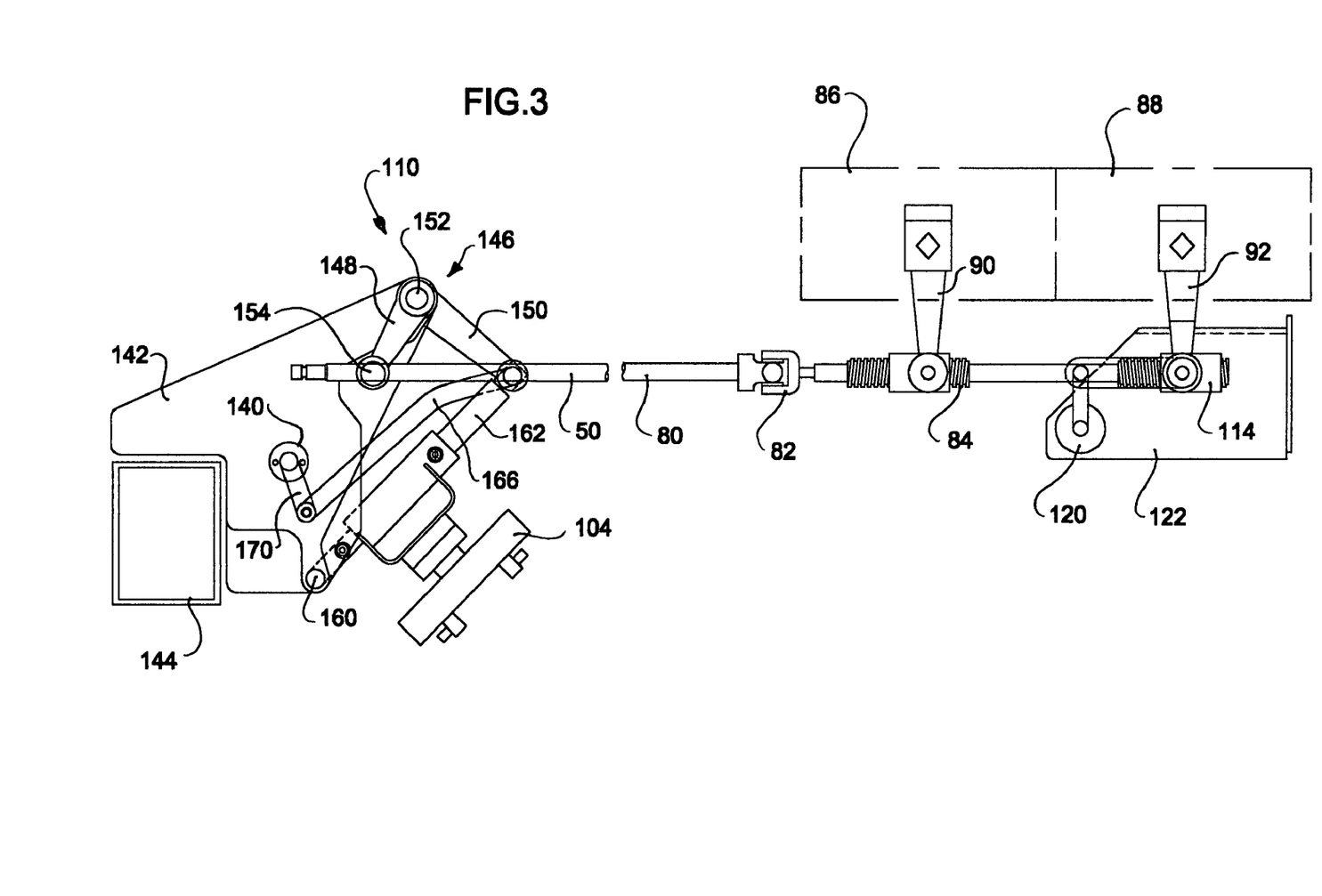
FIG. 3 is an enlargement of the mechanism for engaging the potentiometers of a neutral start interlock system.
Figure 4:
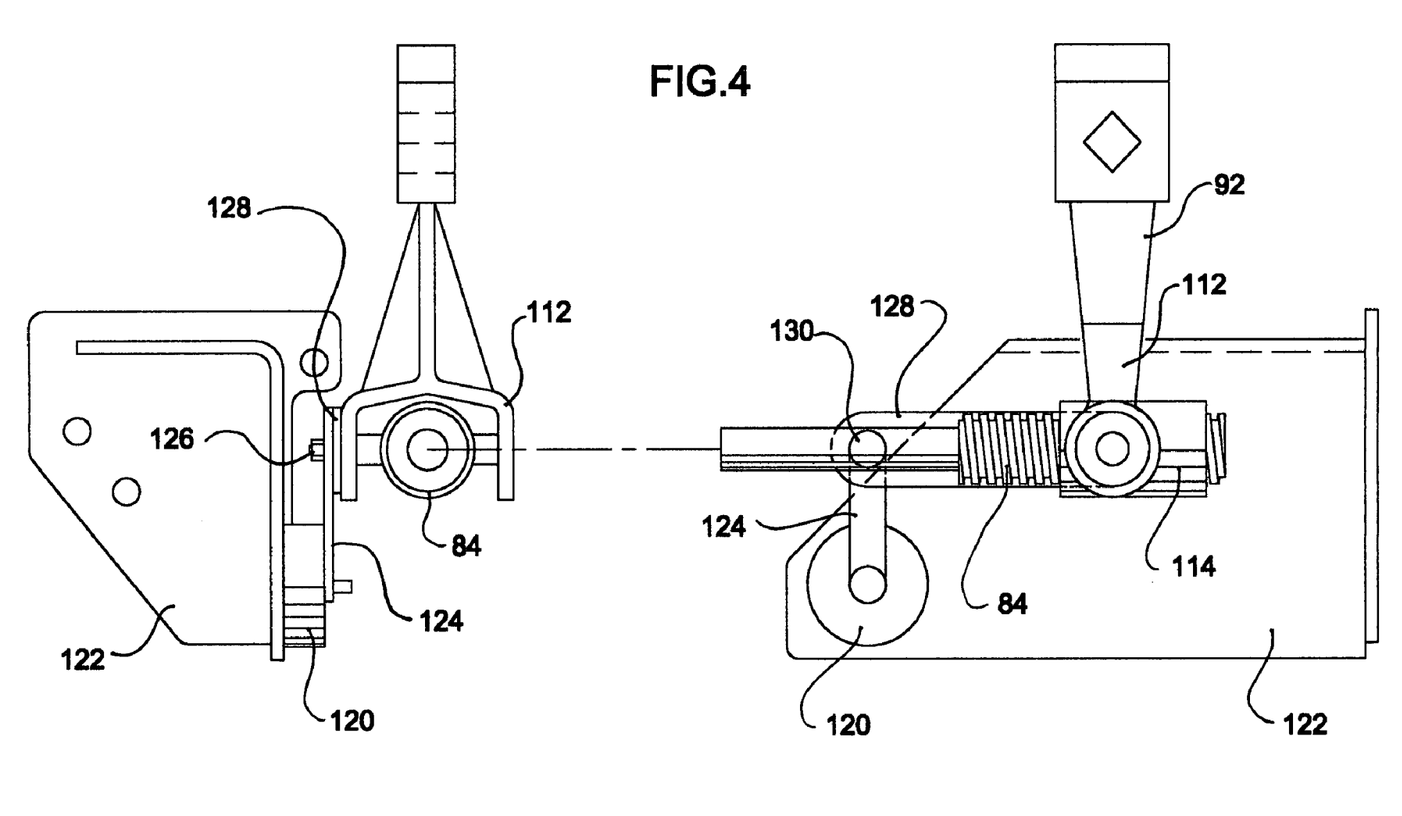
FIG. 4 is a partial side and end view of the pintel arm and the structure used to engage the pintel arm potentiometer.

FIGS. 3 and 4 show that the lower end of each pintel arm terminates in a yoke. In this embodiment, arm 92 terminates in yoke 112 that is pivotably attached to internally threaded block 114 via a pair of horizontally aligned pivot pins on either side of block 114. Block 114 is, in turn, threaded onto member 84. Thus, rotation of member 84 causes block 114 and yoke 112 to move, pivoting the pintel arm 92.

A first potentiometer 120 is affixed to a mounting bracket 122 attached to a structural member or substantial component, such as the engine 94, to provide a steady fixed relationship between the potentiometer and the member 84. A bolt 126 attaches a small horizontally and forwardly extending plate 128 to yoke 112. Adjacent the forward end of plate 128 potentiometer arm 124 is rotatably attached. Thus, as pintel arm 92 moves because of engagement of lever 100 or rotation of member 84, the potentiometer arm 124 rotates, changing the voltage value generated through potentiometer 120.

A second potentiometer 140 is affixed to a mounting bracket 142 attached, similarly to bracket 122, to a structural member or substantial component, such as main frame member 144. A substantially L-shaped arm 146, having legs 148 and 150, is pivotably affixed to bracket 142 at pivot point 152 and fixed in relation to each other. Bottom shaft 50 is connected to arm 148 by a pivotable connector 154 such that as arm 148 rotates about pivot point 152, connector 154 maintains a grip on bottom shaft 50 and allows relative pivoting between shaft 50 and arm 146.

The linear motor 104 is pivotably attached to bracket 142 at pivot point 160 and is set up to extend and retract arm 162 as prompted by the operator through lever 100. Arm 162 is pivotably affixed to the end of leg 150 of L-shaped arm 146, so that extension of arm 162 by motor 104 pivots the L-shaped arm counterclockwise, and retraction of arm 162 pivots the L-shaped arm clockwise. Another arm, 166 is pivotably affixed at one end to the end of leg 150 of L-shaped arm 146, and pivotably attached at the opposing end to potentiometer arm 170. Thus, when lever 100 is moved by the operator, motor 104 extends or retracts arm 162 in response thereto, pivoting the L-shaped arm 146 and moving bottom shaft 50 forwardly or rearwardly. At the same time that arm 146 is rotated, arm 166 rotates potentiometer arm 170, changing the voltage value through potentiometer 140.

The basic concept of the invention is to provide a text message and indicator on the cab display that directs the operator with a text message, or messages, regarding the direction to turn the wheel to reach a neutral position. A potentiometer or similar type of sensor is connected to the steering system to measure the steering position—such as, for instance, the signal from potentiometer 120. After the mechanical steering system is adjusted for mechanical neutral, as described above with reference to the pintel arms 90, 92, an ECU (electronic control unit or controller) is calibrated to set the electronic neutral (potentiometer signal value stored in memory for reference) to correspond to the mechanical neutral, i.e., the steering shaft rotation is said to equal zero degrees. The ECU is of the type that receives signals from various sources, processes them in accordance with its internal programming, and generates output signals based on the processing. Such devices are well known in the art.

Figure 5:
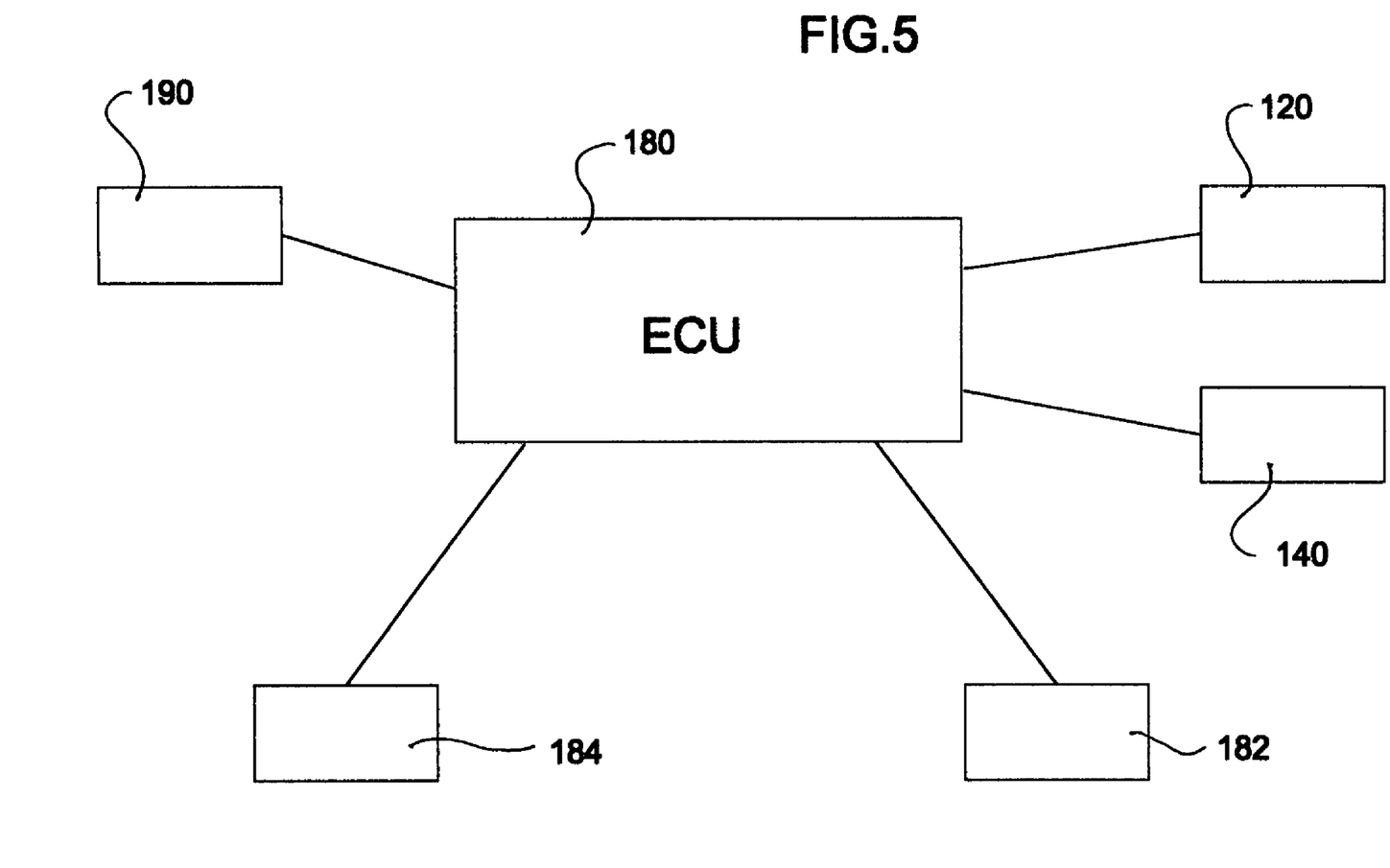
FIG. 5 is a graphic representation of the electrical control and feedback circuitry of a neutral start interlock and the steering wheel direction indicator therefor.

FIG. 5 is a graphic representation of a neutral start system, and the steering wheel direction indicator therefor. Potentiometers 120 and 140, mounted as shown in FIGS. 2-4, ECU 180, starter switch 184 and display 190 mounted in the operator's cab 26. The ECU can take several forms, such as, for example, a programmable processor. The basic function of the neutral start interlock is accomplished broadly by linking potentiometer 120 to the pintel arms of the hydrostatic pumps and potentiometer 140 of the forward-neutra-reverse shift control mechanism 110 and establishing a neutral voltage for each as a result of the neutral setup at the time of machine assembly or during some subsequent service undertaking. The neutral voltage values are fed to the memory of the ECU and serve as neutral reference values. Before the engine starting procedure is initiated by a starter switch 184 for instance, the ECU software either accepts the values and allows the engine to be started by starter 182, or it rejects the values and directs instructions to an in-cab display 190, such as shown in FIGS. 6a-6j, informing the operator which direction to turn the steering wheel 40 to reach neutral. The terms "accepts" and "rejects" as used herein means that a comparison is made of the real time voltage values with the stored reference values and if there is a difference, the starter circuit is disabled. Since there is always some tolerance in mechanical structures and mechanisms, the voltage value that permits the starter circuit to be energized is usually within at least a small range of values. Generally, however, the difference in voltage values is understood to be zero.

In the neutral start up sequence, the controller 180 monitors the steering potentiometer 120 and an algorithm is employed to determine whether the signal is less than or greater than the calibrated neutral reference signal. This also determines the steering direction and position corresponding to the steering wheel rotation (in degrees). The difference between the real time potentiometer signal and the calibrated neutral reference signal is compared to determine how many steering wheel direction arrows need to be shown on the display. The difference between the reference and real time signals decreases as the steering wheel is turned closer to the neutral position and increases as it is turned further away from the neutral position. The steering in neutral position is satisfied when the signal is within the predetermined window for the steering neutral position and the turn steering wheel direction text message will be replaced by an "OK TO START" text message, as shown in FIG. 6e.

Figure 6A:
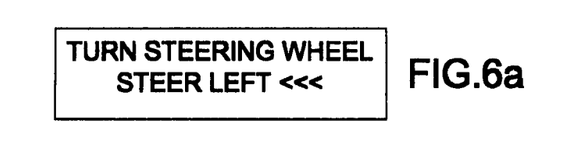
FIGS. 6a-6j are representations of displays that would be suitable for use with the present invention.
Figure 6B:
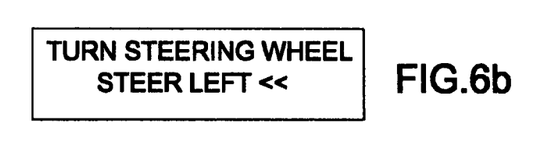
Figure 6C:
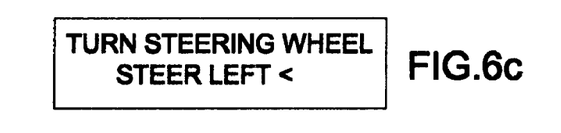
Figure 6D:
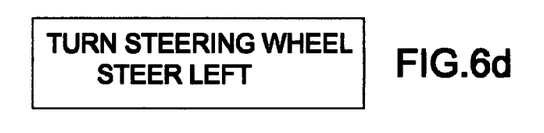
Figure 6E:
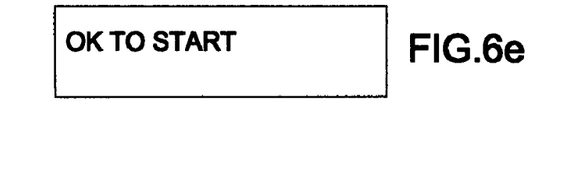
Figure 6F:
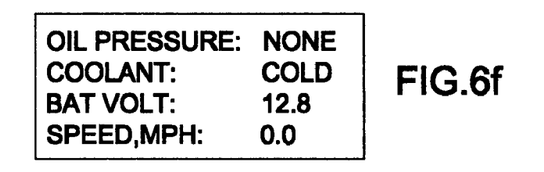
Figure 6G:
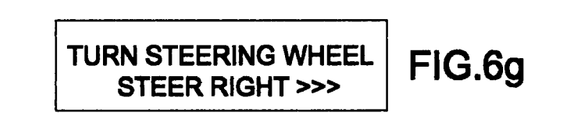
Figure 6H:
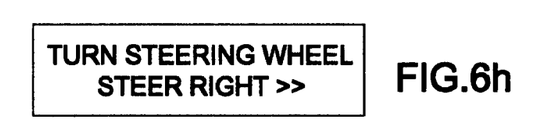
Figure 6I:
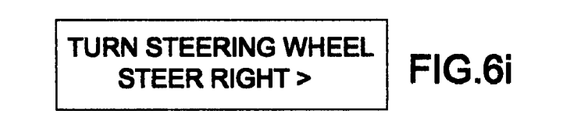
Figure 6J:
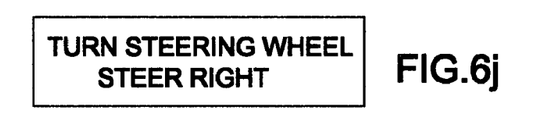

For example, if the difference between the real time signal and the neutral reference equates to greater than 90 degrees of steering wheel rotation to the right from the neutral position, then the display would show a "STEER LEFT" text message accompanied by three left-pointing arrowheads as shown in FIG. 6a. This display informs the operator that he/she must turn the steering wheel to the left to satisfy the neutral start condition. As the steering wheel is turned towards neutral, the difference decreases and when the steering wheel rotation is in the range of greater than 60 to 90 degrees from neutral, the display changes to show a "STEER LEFT" text message accompanied by two left-pointing arrowheads, as in FIG. 6b. When the steering wheel is in the range of greater than 30 to 60 degrees from neutral, the display changes to show a "STEER LEFT" text message accompanied by one left-pointing arrowhead, as in FIG. 6c. When the steering wheel is in the range of 5 to 30 degrees from neutral, the display changes to show a "STEER LEFT" text message without any arrowheads, as in FIG. 6d. And when the steering wheel rotation is less than 5 degrees from neutral, the steering wheel is considered to be in the neutral position, and the display changes to show and "OK TO START" text message, as shown in FIG. 6e, for five seconds (selected as an adequate time interval for the operator to notice the displayed status) followed by the normal display screen of selected menu items, as for example in FIG. 5f. With the exception of the right versus left designation in the text and the direction of the arrowheads, the action of the steer right indication is similar to that of the left (see FIGS. 6g-6j). The number of arrowheads and the exact terminology used in the display may be different than that shown, the important concept being that the direction and the amount of turning required by displayed in a clear manner.

It will be understood that changes in the details, materials, steps and arrangements of parts which have been described and illustrated to explain the nature of the invention will occur to and may be made by those skilled in the art upon a reading of this disclosure within the principles and scope of the invention. For instance, the ranges chosen for the changing visual directions do not have to be in 30 degree segments, but rather could be in any reasonable grouping. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of indicating the direction and amount to turn a steering wheel of a self-propelled vehicle to bring it to a neutral location for a neutral start mechanism comprising the steps of:

providing a self-propelled vehicle with an engine, an engine starting system connected to the engine, and at least one drive wheel operable by power supplied by the engine via a hydraulic pump with a displacement control;

providing an ECU with a memory and programmable signal processing capabilities;

providing a visual display device receiving signals from the ECU to determine the visual output of the display device;

providing a steering mechanism for the vehicle including a steering wheel, the steering wheel having a neutral position wherein the displacement control of the drive wheel pump will be at a neutral position suppressing motion of the drive wheel that would cause movement of the vehicle;

providing a sensor to measure the rotational position of the steering wheel relative to the neutral position and transmit generally continuous signals to the ECU, the signal value from the sensor changing as the relative position changes between the neutral position of the steering wheel and real time position thereof;

storing, within the ECU memory, a reference signal value from the sensor when the steering wheel is in the neutral position;

before initiating the engine starting system:

comparing within the ECU, on a generally continuous basis, the real time signal from the sensor with the stored neutral position value and establishing a difference value;

establishing a plurality of non-overlapping ranges of difference values for both left and right non-neutral positions for the steering wheel;

transmitting control signals to the display device dependent upon the particular range within the plurality of ranges that the real time difference value falls, each range having its own visual output including either printed text indicating the direction that the steering wheel must be turned to approach neutral or printed text and non-textual indicators of the general amount that the steering wheel must be turned to reach neutral;

turning the steering wheel as indicated by the display device until the neutral position is reached;

transmitting a notification signal to the neutral start system indicating that the steering is in the neutral position;

transmitting a control signal to the display device when neutral is reached, the neutral position having its own visual output including printed text indicating that the engine start system may be engaged; and initiating the engine starting system when the display device indicates that it is appropriate to do so.

2. The method of claim 1, wherein:

the neutral position of the steering wheel is a range equivalent to left and right a value less than five degrees of true neutral.

3. The method of claim 2, wherein the step of establishing a plurality of non-overlapping ranges of difference values further includes the step of:

establishing additional ranges at 5 to 30, greater than 30 to 60, greater than 60 to 90, and greater than 90 degrees, both left and right.

4. The method of claim 3, wherein the non-textual indicators are arrowheads pointing in the direction that the steering wheel should be turned to reach the neutral position.

5. The method of claim 1, wherein the non-textual indicators are arrowheads pointing in the direction that the steering wheel should be turned to reach the neutral position.

6. A method of indicating the direction and amount to turn a steering wheel of a self-propelled vehicle to bring it to a neutral location comprising the steps of:

providing a self-propelled vehicle with an engine, an engine starting system connected to the engine, and at least one drive wheel operable by power supplied by the engine via a hydraulic pump with a displacement control;

providing an ECU with a memory and programmable signal processing capabilities;

providing a visual display device receiving signals from the ECU to determine the visual output of the display device;

providing a steering mechanism for the vehicle including a steering wheel, the steering wheel having a neutral position wherein the displacement control of the drive wheel pump will be at a neutral position suppressing motion of the drive wheel that would cause movement of the vehicle;

providing a sensor to measure the rotational position of the steering wheel relative to the neutral position and transmit generally continuous signals to the ECU, the signal value from the sensor changing as the relative position changes between the neutral position of the steering wheel and real time position thereof;

storing, within the ECU memory, a reference signal value from the sensor when the steering wheel is in the neutral position;

comparing within the ECU, on a generally continuous basis, the real time signal from the sensor with the stored neutral position value and establishing a difference value;

establishing a plurality of non-overlapping ranges of difference values for both left and right non-neutral positions for the steering wheel;

transmitting control signals to the display device dependent upon the particular range within the plurality of ranges that the real time difference value falls, each range having its own visual output including either printed text indicating the direction that the steering wheel must be turned to reach neutral or printed text and non-textual indicators of the general amount that the steering wheel must be turned to reach neutral;

turning the steering wheel as indicated by the display device until the neutral position is reached; and transmitting a control signal to the display device when neutral is reached, the neutral position having its own visual output including printed text indicating that the neutral position has been reached.

7. The method of claim 6, wherein the non-textual indicators are arrowheads pointing in the direction that the steering wheel should be turned to reach the neutral position.

8. The method of claim 7, wherein:

the neutral position of the steering wheel is a range equivalent to left and right a value less than five degrees of true neutral.

9. The method of claim 8, wherein the step of establishing a plurality of non-overlapping ranges of difference values further includes the step of:

establishing additional ranges at 5 to 30, greater than 30 to 60, greater than 60 to 90, and greater than 90 degrees, both left and right.

10. The method of claim 6, wherein the step of establishing a plurality of non-overlapping ranges of difference values further includes the step of:

establishing additional ranges at 5 to 30, greater than 30 to 60, greater than 60 to 90, and greater than 90 degrees, both left and right.

11. The method of claim 10, wherein:

the neutral position of the steering wheel is a range equivalent to left and right a value less than five degrees of true neutral.

12. The method of claim 11, further including the steps of:

providing a neutral start system that prevents the engine starting system from starting the engine until and unless the steering wheel is in the neutral position;

when the steering wheel is in the neutral position, transmitting a notification signal to the neutral start system indicating that the condition has been met; and transmitting a control signal to the display device when the steering wheel is in the neutral position, that condition having its own visual output including printed text indicating that the engine start system may be engaged.

* * * * *